Aug. 2, 1932.          G. WALTHER          1,869,634
                          WHEEL
              Filed Jan. 21, 1929    3 Sheets-Sheet 1
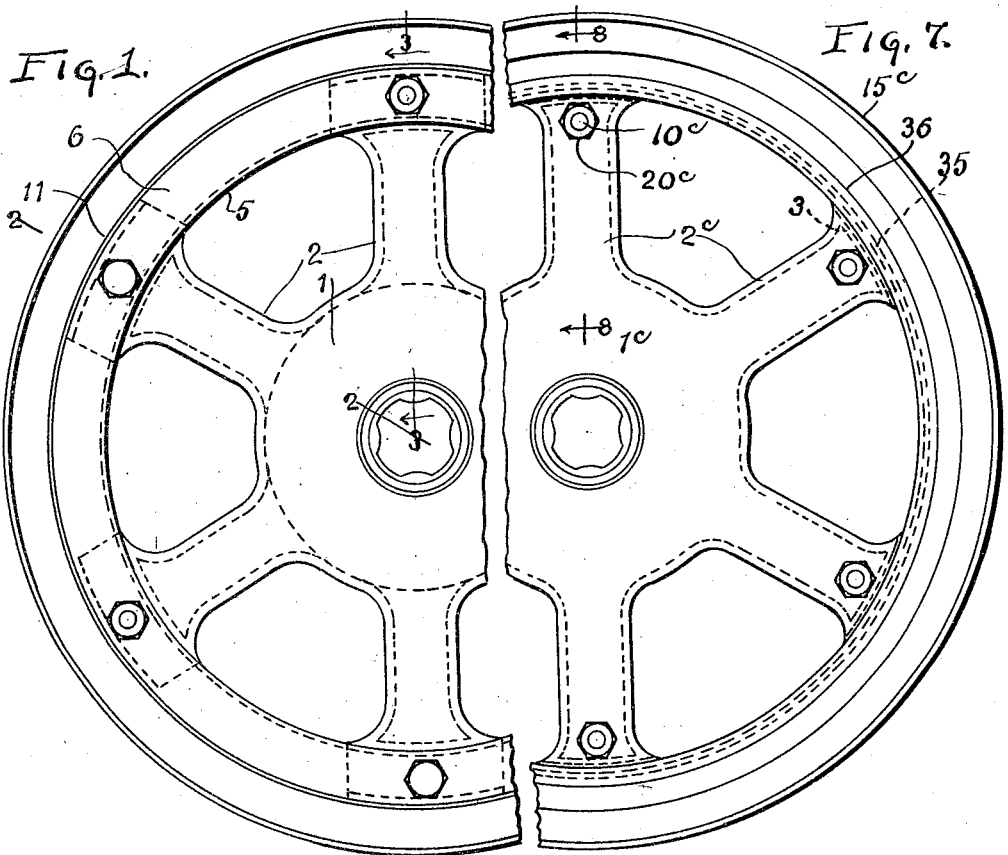
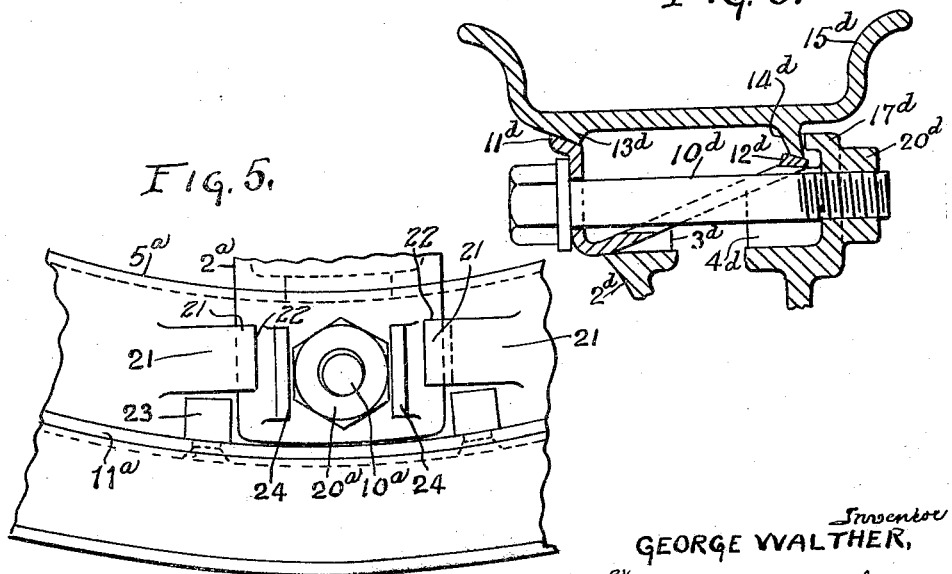
Inventor
GEORGE WALTHER,
BY Toulmin & Toulmin
Attorneys Aug. 2, 1932.  G. WALTHER  1,869,634
WHEEL
Filed Jan. 21, 1929  3 Sheets-Sheet 2

Inventor
GEORGE WALTHER,
By Toulmin & Toulmin
Attorneys

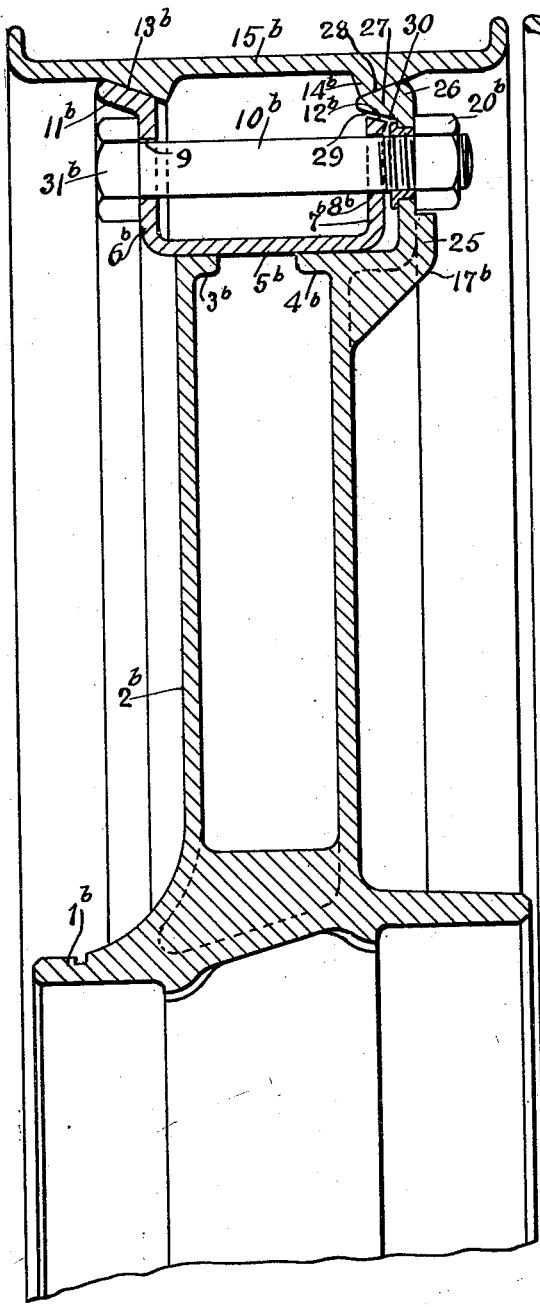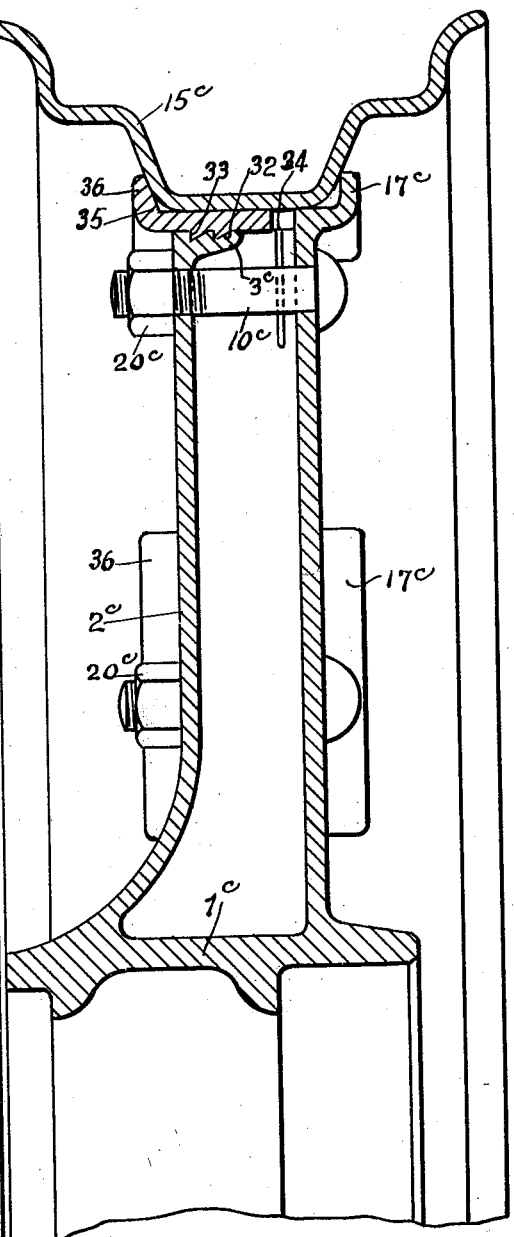

Patented Aug. 2, 1932

1,869,634

UNITED STATES PATENT OFFICE

GEORGE WALTHER, OF DAYTON, OHIO

WHEEL

Application filed January 21, 1929. Serial No. 333,778.

My invention relates to wheels.

It is the object of my invention to provide a three-part wheel consisting of a hub and spoke unit, and combining a detachable felloe and rim attaching unit, and a rim unit.

It is my object to permit of the production of interchangeable malleable hub and spoke units and pressed or rolled steel felloe and rim units so that they may be produced in either the same or different factories and may be assembled interchangeably so as to facilitate production of wheels and their component parts in different types of factories, especially adapted to the production of the material in question.

It is a further object to provide self-aligning means for attaching the wheel rim to the wheels, eliminating the wedge rings, individual clamping members and the like, which have heretofore been employed.

It is a further object to provide the combination of a malleable hub and spokes which can be cast in one piece, but which cannot be cast with a rim, with a steel rim utilizing the spoke ends as an aligning abutment for the steel rim and as an abutment against which the wheel rim can be held by the detachable felloe which serves both as a felloe and as a means of attaching the wheel rim to the spoke ends. Any cast metal may be employed, but malleable is preferred.

It is a further object to provide attaching bolts and nuts so arranged that a very few are necessary, and so arranged that the parts are self-aligning.

It is a further object to provide a wheel with a minimum of mechanical attachments on the outside thereof so as to improve the appearance of the wheel and to provide a structure of such grace and beauty that it will be adaptable to passenger cars and the like.

Referring to the drawings:

Figure 1 is a front elevation of a segment of a typical wheel, combining the features of my invention.

Figure 5 is a detail view of the inboard side of the wheel showing lugs for positioning the felloe and for holding attaching nuts.

Figure 6 is a sectional view, showing a modified form of the spoke ends having wedge shaped outer end abutments.

Figure 7 is a front elevation of a segment of a wheel employing a modified form of top screw rim.

Figure 8 is a section on the line 8—8 of Figure 7.

Figure 9 is a section showing a tapered felloe ring.

Figure 2:
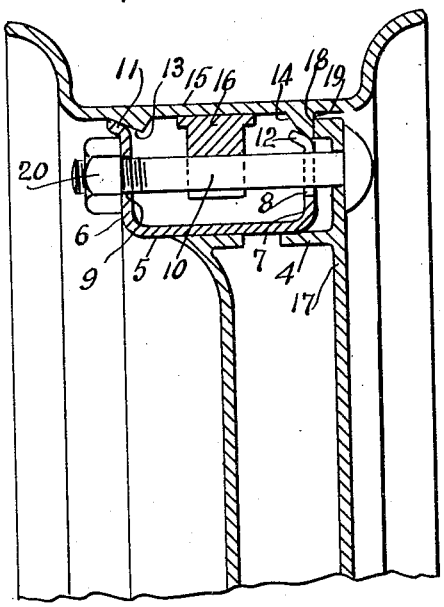
Figure 2 is a section on the line 2—2 of Figure 1.

Referring in detail to the drawings, 1 indicates a hub. On this hub is a single wheel or cylindrical body, although it may be made of any desired shape. It is provided with integral cast spokes 2 that are preferably tubular. These spokes terminate in spaced spoke ends, each consisting of arcuate supporting platforms 3 and 4 which extend inwardly towards each other, upon which the felloe ring 5 is mounted. The felloe ring 5 bridges the free ends of the malleable spokes, joining them together into a complete wheel.

This felloe ring is provided with radially outwardly extending side walls 6 and 7, which are provided with apertures 8 and 9 for receiving the retaining bolts 10. The marginal portions of the felloe ring walls are turned over, as at 11 and 12, to form wedging supporting surfaces for engaging with cooperating tapered shoulders 13 and 14 that are formed on the radially inside surface of the tire rim 15. The felloe may be tapered where it meets the spoke ends.

These tapered shoulders 13 and 14 are of different radial distances from the center of the wheels; the shoulder of least distance 14 engaging with the peripheral surface of the shorter side wall 7, as at 12, while the longer or higher wall 6 has its peripheral face 11 engaging with the other shoulder 13. The rim itself has extending radially inward from it driving lugs 16 engaging with alternate bolts 10 for preventing the rotation of the tire rim 15 upon the felloe ring.

Figure 3:
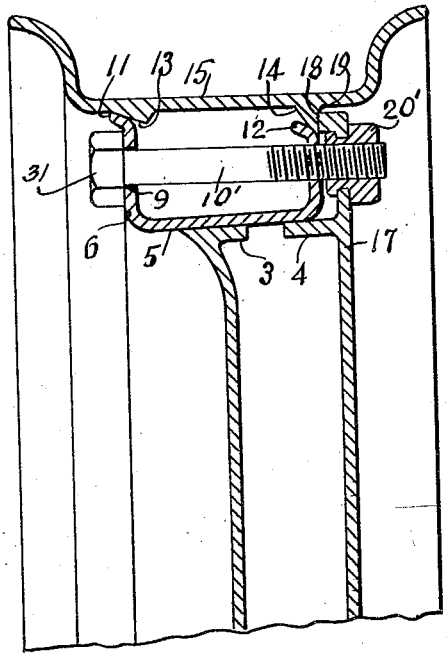
Figure 3 is a section on the line 3—3 of Figure 1, showing a ring lug and the nuts of the attaching bolts permanently held in concealed position.

The spoke end is projected radially outward on its inboard side, as at 17, to form a wall with an abutting surface 18 for engaging with the vertical wall 19 of the shoulder 14. This forms a positive aligning stop for exactly positioning the tire rim on the spoke ends. The upward extending wall 17 of the spoke end also serves as a support for the bolt 10', or for the nut 20' which is permanently attached to it, as in Figure 3. In such an instance the nut 20 is so mounted within the wall 17 that it cannot turn so that the bolt 10 can be easily threaded through it, thus preventing the loss of the nut. The usual form of nut is indicated by the numeral 20.

In mounting the felloe ring 5, it is desirable to first place the wheel rim in position with the abutting surface 18 of the spoke end engaging the wall 19 of the tire rim shoulder 14, and then place the felloe ring in position on the platforms 3 and 4 for supporting the tire rim, which is thus accurately positioned and clamped in place when the nuts 20 are drawn up on the bolts 10. I thus am enabled to secure the advantages of a cheap, malleable wheel which cannot be cast with a rim, while at the same time eliminating the usual clamps, wedge rings and other attaching means that do not bring the tire rim into proper alignment. The use of the radial projection and its abutting surface on the spoke end provides for this so that the spoke end acts both as an aligner for the tire rim, an abutment for clamping the tire rim in position between it and the felloe ring, and the spoke ends also act as a support for this felloe for accurately positioning and supporting it.

Figure 4:
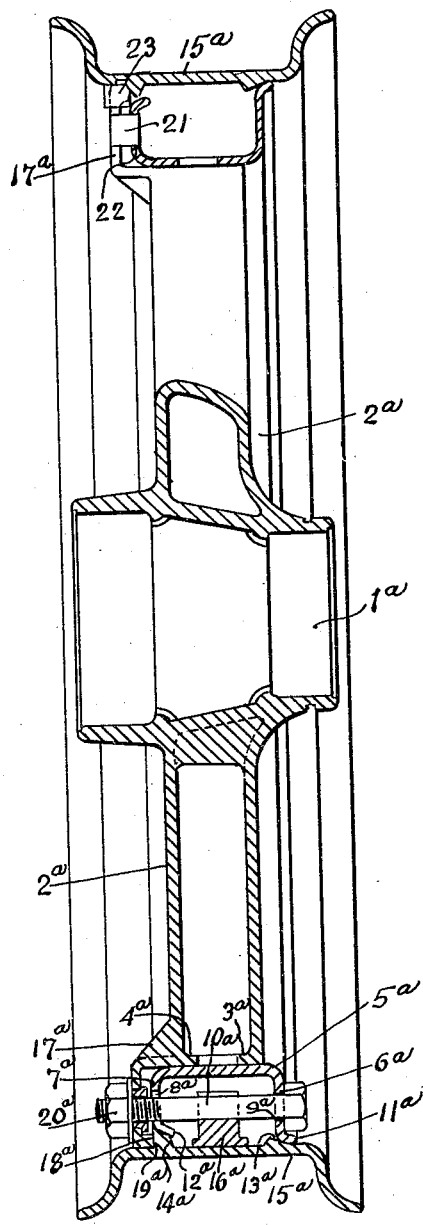
Figure 4 is a modified section showing a form of wheel having an attaching lug for insuring the driving connection between the spoke, felloe and rim.

It may be desired to provide on the felloe ring, as shown in Figures 4 and 5 laterally extending positioning lugs 21 extending into slots 22 of the spoke end wall 17a to exactly position the felloe on the spokes. The lugs 21 are struck up from the inboard side wall of the steel felloe ring. I also provide radially inwardly projecting lugs 23 on the tire rim 15a which engage either side of the wall 17a so that the tire rim will not rotate relative to the spoke ends.

I further provide on these radially projecting walls 17a of the spoke ends spaced abutments or lugs 24, which engage the side walls of the square or hexagon nuts 20a to prevent their rotation. In the form shown in these Figures 4 and 5 the hub is indicated by 1a and the spokes by 2a. 3a and 4a indicate platforms for supporting a felloe ring 5a, which has laterally and radially outstanding walls 6a and 7a with apertures therethrough 8a and 9a for receiving a bolt 10a. The walls have tapered shoulders 11a and 12a to engage tapered shoulders 13a and 14a on the tire rim 15a. On the bolt 10a is a nut 20a.

In the modified form shown in Figure 6 I have provided a spoke end having on the inboard side an offset bracket member 25, which has a radially outwardly extending wall 26, the outer edge of which extends laterally toward the inboard side of the wheel in a wedge shaped ring formation 27. The radially outer tapered surface 28 engages with the tapered surface of the lug 14b. The radially inner tapered surface 29 is spaced from the tapered surface 30 of the turned over margin 12b of the felloe ring.

This arrangement gives a broader bearing surface for the felloe ring and provides means of clamping the spoke ends between the felloe ring and the tire rim 15b, which results in a very rigid structure that is easily aligned as the nut 20b is carried in the wall 26 non-rotatably, with the result that the bolt 10b can be easily threaded therethrough leaving only the bolt head 31 on the outside of the wheel, so that a neat appearance is presented.

In Figure 6 the hub is indicated by the numeral 1b while the spokes extending therefrom are indicated by 2b. 3b and 4b indicate platforms extending toward each other for supporting the felloe ring 5b, which has extending laterally and radially therefrom side walls 6b and 7b with apertures 8b and 9b therethrough for receiving a bolt 10b. The outer edges of the walls are turned over at 11b and 12b to receive coengaging shoulders 13b and 14b on the tire rim 15b. The inboard side of the wheel has thereon wall 17b, which has located therein a nut 20b, for receiving the bolt 10b.

Referring to the modification shown in Figures 7 and 8, this consists of the usual hub 1c and spokes 2c, of integral cast malleable construction. The supporting ledge 3c is provided with a spiral groove having a tapered wall 32 and a vertical wall 33. The spoke end is slotted, as at 34, so that it can be slightly collapsed while the radially outwardly extending ledge 17c is shorter than similar member in the other figures.

The bolt 10c passes directly through the side walls of the outer ends of the spokes so that when the nut 20c is drawn up on the bolt 10c the free ends of the spokes will be collapsed slightly for the following purpose: The felloe ring consists of an annular plate 35 having a thread corresponding to the grooved walls 32 and 33, in which it is threaded. The felloe ring is provided with a clamping shoulder 36 that engages against the outside of the tire rim 15c, while the other side is engaged by the ledge 17c of the spoke end.

After the annular plate 35 has been threaded on the spoke ends and the tire rim is thus clamped in position, the final clamping of the structure is effected by collapsing the spoke ends through tightening up the nut 20c on the bolt 10c.

In Figure 9 a modified form of felloe is shown. In this form the spoke is indicated by 2d while the platforms on the end of the spoke are indicated by 3d and 4d. The inboard extension on the spoke end is indicated by 17d and has a hole therethrough for receiving the bolt 10d, which has on its threaded end a nut 20d. The felloe ring has an outboard upstanding part with a flange 11d thereon, to be engaged by a projection 13d on the tire rim 15d. On the other side of the felloe from the flange 11d is a flange 12d cooperating with a projection 14d, and with extensions 17d for holding the felloe ring in position on the spoke end. The bolt 10d passes through the felloe and the part 17d.

I desire to comprehend within my invention such modifications as may be clearly embraced within my claims and the scope of my invention.

Having thus fully described my invention, what I claim as new and desire to secure by Letters Patent, is:

1. The combination of a wheel body for supporting a single tire-carrying rim, a tire-carrying rim on said wheel body, said wheel body having a peripheral supporting surface and an aligning abutment adjacent the inboard supporting surface for alignment of the tire-carrying rim and contacting the same, a detachable felloe mounted on said peripheral surface for supporting the tire-carrying rim, said felloe having a wedging surface for contacting with the said rim, means for forcing said felloe on said wheel body to force said rim into contact with said aligning abutment on the wheel body, and lugs on said felloe and cooperating surfaces on said abutment for positioning the felloe on said wheel body.

2. The combination of a wheel body for supporting a single tire-carrying rim, a tire-carrying rim on said wheel body, said wheel body having a peripheral supporting surface and an aligning abutment adjacent the inboard supporting surface for alignment of the tire-carrying rim and contacting the same, a detachable felloe mounted on said peripheral surface for supporting the tire-carrying rim and having a wedging surface for contacting with said rim, an internally threaded member carried by said abutment, a threaded member extending through said felloe in threaded engagement with said internally threaded member for forcing said felloe onto said wheel body to force said rim into contact with said aligning abutment on the wheel body, and lugs on said felloe and cooperating surfaces on said abutment for positioning said felloe on said wheel body.

In testimony whereof, I affix my signature.

GEORGE WALTHER.